United States Patent
Garimella et al.

(10) Patent No.: US 10,533,514 B2
(45) Date of Patent: Jan. 14, 2020

(54) SELECTIVE FUEL ON TIME AND COMBUSTION CENTROID MODULATION TO COMPENSATE FOR INJECTION NOZZLE CAVITATION AND MAINTAIN ENGINE POWER OUTPUT AND EMISSIONS FOR LARGE BORE HIGH-SPEED DIESEL ENGINE

(71) Applicant: CUMMINS INC., Columbus, IN (US)

(72) Inventors: Phanindra V. Garimella, Bloomington, IN (US); John L. Hoehne, Columbus, IN (US); Ian W. McGiffen, Scipio, IN (US); Chandan Mahato, Columbus, IN (US); Boopathi Singalandapuram Mahadevan, Columbus, IN (US); Pagalavan Mathari Bakthavatsalam, Columbus, IN (US); Travis Alva Anderson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 152 days.

(21) Appl. No.: 15/578,924

(22) PCT Filed: Jun. 2, 2017

(86) PCT No.: PCT/US2017/035651
§ 371 (c)(1),
(2) Date: Dec. 1, 2017

(87) PCT Pub. No.: WO2017/218211
PCT Pub. Date: Dec. 21, 2017

(65) Prior Publication Data
US 2019/0226420 A1    Jul. 25, 2019

Related U.S. Application Data

(60) Provisional application No. 62/350,392, filed on Jun. 15, 2016.

(51) Int. Cl.
*F02D 41/40* (2006.01)
*F02D 41/38* (2006.01)
(Continued)

(52) U.S. Cl.
CPC ........... *F02D 41/40* (2013.01); *F02D 41/008* (2013.01); *F02D 41/009* (2013.01);
(Continued)

(58) Field of Classification Search
CPC .... F02D 41/40; F02D 41/1461; F02D 41/009; F02D 41/021; F02D 41/04; F02D 41/008;
(Continued)

(56) References Cited

U.S. PATENT DOCUMENTS 5,715,794 A * 2/1998 Nakamura ............... F02D 21/08
123/305
5,738,074 A * 4/1998 Nakamura ............. F02D 35/023
123/305

(Continued)

FOREIGN PATENT DOCUMENTS

DE    102011004068 B3    8/2012
DE    102014207268 A1    10/2015
(Continued)

OTHER PUBLICATIONS

International Search Report issued by International Searching Authority, dated Aug. 10, 2017, for corresponding International Patent Application No. PCT/US2017/035651; 2 pages.
(Continued)

*Primary Examiner* — Hung Q Nguyen
(74) *Attorney, Agent, or Firm* — Faegre Baker Daniels LLP (57) ABSTRACT

A method of controlling a fuel injector comprises measuring a pressure in a cylinder of an engine with a pressure sensor and determining at least one of a crank angle and a crank
(Continued)

speed with a crank sensor. The method also comprises calculating a net indicated mean effective pressure of the cylinder from the measured value of the pressure sensor and the determined value of the crank sensor. Also, the method comprises adjusting a fueling parameter of a fuel injector for the cylinder in response to the difference between the calculated net indicated mean effective pressure and a reference mean effective pressure indicates a change in power of the engine. Alternatively, the method may adjust the fueling parameter based on a power feedback signal for the engine.

20 Claims, 5 Drawing Sheets (51) Int. Cl.
*F02D 41/00* (2006.01)
*F02D 41/02* (2006.01)
*F02D 41/04* (2006.01)
*F02D 41/14* (2006.01)

(52) U.S. Cl.
CPC ........... *F02D 41/021* (2013.01); *F02D 41/04* (2013.01); *F02D 41/1461* (2013.01); *F02D 41/3836* (2013.01); *F02D 2200/024* (2013.01); *F02D 2200/1004* (2013.01); *F02D 2200/50* (2013.01); *F02D 2200/703* (2013.01)

(58) Field of Classification Search
CPC ........... F02D 41/3836; F02D 2200/024; F02D 2200/1004; F02D 2200/703; F02D 2200/50

See application file for complete search history.

(56) References Cited

U.S. PATENT DOCUMENTS

| | | | |
|---|---|---|---|
| 5,778,857 A * | 7/1998 | Nakamura | F02D 35/023 |
| | | | 123/406.29 |
| 7,069,138 B2 | 6/2006 | Böhnig et al. | |
| 7,139,657 B2 | 11/2006 | Bouchain et al. | |
| 7,277,790 B1 * | 10/2007 | Green, Jr. | F02B 77/085 |
| | | | 701/105 |
| 8,260,526 B2 | 9/2012 | Loeffler et al. | |
| 8,746,050 B2 | 6/2014 | Cueto | |
| 2001/0017127 A1 | 8/2001 | Flynn et al. | |
| 2002/0007816 A1 | 1/2002 | Zur Loye et al. | |
| 2005/0039721 A1 * | 2/2005 | Truscott | F02D 35/023 |
| | | | 123/406.22 |
| 2006/0293829 A1 * | 12/2006 | Cornwell | F02D 35/023 |
| | | | 701/114 |
| 2008/0053405 A1 * | 3/2008 | Vigild | F02D 35/027 |
| | | | 123/406.26 |
| 2008/0133113 A1 * | 6/2008 | Yasui | F01L 1/352 |
| | | | 701/105 |
| 2008/0173265 A1 | 7/2008 | Sandquist et al. | |
| 2009/0229562 A1 * | 9/2009 | Ramappan | F02B 1/14 |
| | | | 123/295 |
| 2010/0018483 A1 * | 1/2010 | He | F02D 13/0265 |
| | | | 123/90.15 |
| 2010/0043751 A1 * | 2/2010 | Kweon | F02D 35/023 |
| | | | 123/435 |
| 2011/0172899 A1 * | 7/2011 | Haskara | F02D 35/023 |
| | | | 701/104 |
| 2012/0042850 A1 * | 2/2012 | Haskara | F02D 41/0072 |
| | | | 123/305 |
| 2012/0095668 A1 * | 4/2012 | Landsmann | F02D 35/023 |
| | | | 701/103 |
| 2012/0191325 A1 * | 7/2012 | Haskara | F02D 35/023 |
| | | | 701/104 |
| 2012/0277970 A1 * | 11/2012 | Rayl | F02D 35/023 |
| | | | 701/102 |
| 2013/0139788 A1 | 6/2013 | Sujan et al. | |
| 2013/0197781 A1 * | 8/2013 | Shin | F02D 41/2438 |
| | | | 701/103 |
| 2014/0039779 A1 | 2/2014 | Jung et al. | |
| 2014/0251275 A1 | 9/2014 | Lana | |
| 2017/0107920 A1 * | 4/2017 | Roth | F02D 35/02 |
| 2017/0298850 A1 * | 10/2017 | Kurtz | F01N 11/007 |
| 2017/0314500 A1 * | 11/2017 | Ogata | F02M 26/00 |

FOREIGN PATENT DOCUMENTS

| | | | |
|---|---|---|---|
| DE | 102014207272 A1 | 10/2015 | |
| EP | 2385236 A1 * | 11/2011 | ........... F02D 41/222 |
| WO | 2017/076450 | 5/2017 | |

OTHER PUBLICATIONS

Written Opinion of the International Searching Authority, dated Aug. 10, 2017, for corresponding International Patent Application No. PCT/US2017/035651; 4 pages.

Examination report issued by the German Patent Office (German language), dated Aug. 6, 2018, for Application No. DE112017000051.3; 7 pages.

Examination report issued by the German Patent Office (translated to English language), dated Aug. 6, 2018, for Application No. DE112017000051.3; 6 pages.

International Search Report and Written Opinion dated Aug. 1, 2017 in International Application No. PCT/US2017/035651.

* cited by examiner

SELECTIVE FUEL ON TIME AND COMBUSTION CENTROID MODULATION TO COMPENSATE FOR INJECTION NOZZLE CAVITATION AND MAINTAIN ENGINE POWER OUTPUT AND EMISSIONS FOR LARGE BORE HIGH-SPEED DIESEL ENGINE

CROSS-REFERENCE TO RELATED APPLICATIONS

The present application is a national stage application of International (PCT) Patent Application Serial No. PCT/US2017/035651, filed on Jun. 2, 2017, which claims priority to U.S. Provisional Patent Application Ser. No. 62/350,392, filed Jun. 15, 2016, the complete disclosures of which are expressly incorporated by reference herein.

FIELD OF THE INVENTION

The present invention relates generally to adjusting a fueling parameter of a fuel injector and, more particularly, to a method for detecting a change to engine power due to the wear at the fuel injector nozzle and adjusting the fuel flow to compensate for the wear.

BACKGROUND OF THE DISCLOSURE

Large bore engines may experience wear, such as surface fatigue, due to cavitation, at fuel injector nozzles. The wear caused by cavitation at the injection nozzle may decrease fuel flow through the nozzle and, therefore, result in decreased engine power. In addition to power, it is necessary to maintain the emissions output at predetermined levels, for example, such as the amount of nitrogen oxide ("NOx") detected in the emissions fluid.

SUMMARY OF THE DISCLOSURE

In one embodiment, a method of controlling a fuel injector comprises measuring a pressure in a cylinder of an engine with a pressure sensor and determining at least one of a crank angle and a crank speed with a crank sensor. The method also comprises calculating a net indicated mean effective pressure of the cylinder from the measured value of the pressure sensor and the determined value of the crank sensor. Also, the method comprises adjusting a fueling parameter of a fuel injector for the cylinder in response to the difference between the calculated net indicated mean effective pressure and a reference mean effective pressure indicates a change in power of the engine.

In another embodiment, a method of controlling a fuel injector comprises obtaining a power signal indicative of a power output of an engine and transmitting to an engine control module the power signal. The method also comprises comparing, with the engine control module, the obtained power signal to a reference power signal. Additionally, the method comprises determining, with the engine control module, a difference between the obtained power signal and the reference power signal. Also, the method comprises adjusting, with the engine control module, a fueling parameter of a fuel injector when the difference between the obtained power signal and the reference power signal indicates a change in power of the engine.

In a further embodiment, a control system for an engine comprises a control module including a memory, at least one receiver, and at least one transmitter. The control system also comprises a pressure sensor operably coupled to the control module and configured to transmit a cylinder pressure to the receiver, a crank sensor operably coupled to the control module and configured to transmit at least one of a crank angle or a crank speed to the receiver, an ambient conditions sensor operably coupled to the control module and configured to transmit at least one of a temperature, humidity, or air pressure to the receiver, and an emissions sensor operably coupled to the control module and configured to transmit at least one emissions condition to the receiver. The control module is configured to calculate a net indicative mean effective pressure based on the cylinder pressure and the at least one of the crank angle or the crank speed. The transmitter of the control module is configured to transmit a fuel adjustment signal to a fuel injector of the engine based on the calculated net indicative mean effective pressure.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 1A:
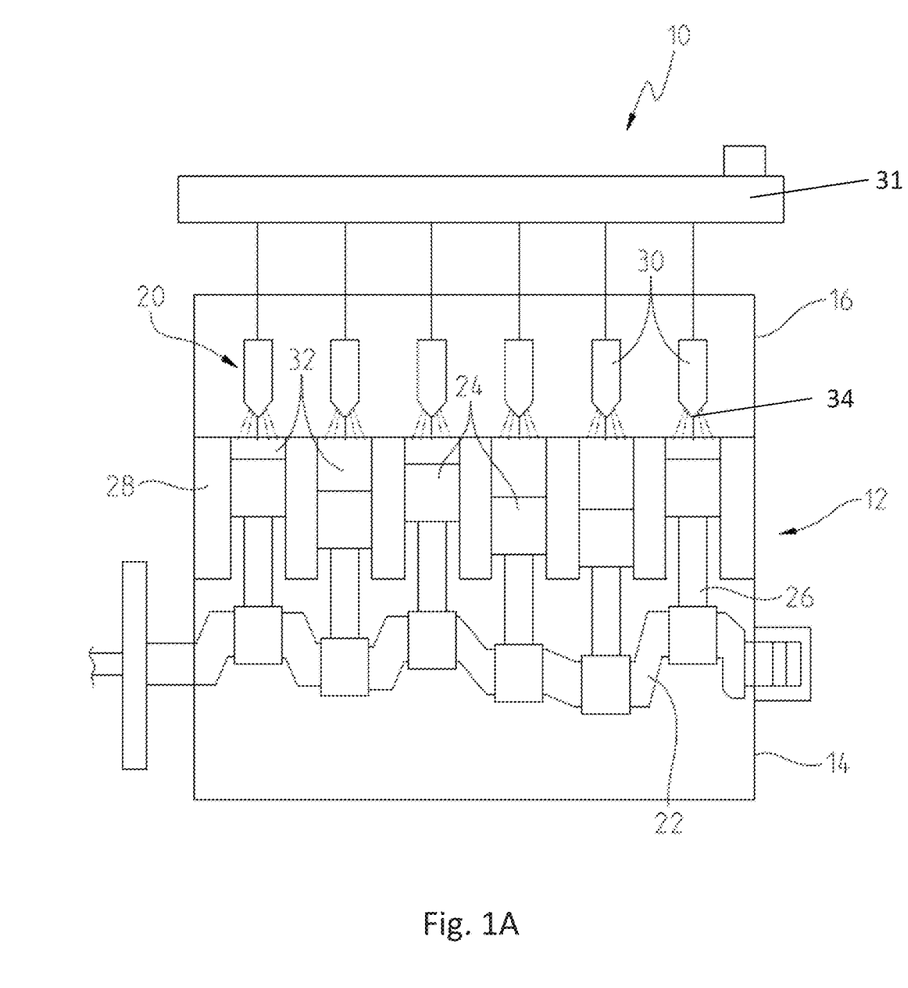
FIG. 1A is a schematic of an engine.

Referring to FIG. 1A, a portion of an internal combustion engine 10 is shown as a simplified schematic. Engine 10 includes an engine body 12, which supports an engine block 14, a cylinder head 16 coupled to engine block 14, and a fuel system 20. Engine body 12 further includes a crankshaft 22, a plurality of pistons 24, and a plurality of connecting rods 26. Pistons 24 are configured for reciprocal movement within a plurality of engine cylinders 28, with one piston 24 positioned in each engine cylinder 28. Each piston 24 is operably coupled to crankshaft 22 through one of connecting rods 26. A plurality of combustion chambers 32 are each defined by one piston 24, cylinder head 16, and cylinder 28. The movement of pistons 24 under the action of a combustion process in engine 10 causes connecting rods 26 to move crankshaft 22. In one embodiment, engine 10 may be characterized as a large-bore, high-speed engine. For example, engine 10 may be a two-stroke engine, a four-stroke engine, a diesel engine, an internal combustion engine, or any other type of engine.

Referring still to FIG. 1A, when engine 10 is operating, a combustion process occurs in combustion chambers 32 to cause movement of pistons 24. The movement of pistons 24 causes movement of connecting rods 26, which are drivingly connected to crankshaft 22, and movement of connecting rods 26 causes rotary movement of crankshaft 22. The angle of rotation of crankshaft 22 may be measured by a crank sensor 36 of a control system 18 (FIG. 1B) for engine 10 to aid in timing the combustion events in engine 10 and for other purposes. The angle of rotation of crankshaft 22 also may be measured by crank sensor 36 in a plurality of locations, including a main crank pulley (not shown), an engine flywheel (not shown), an engine camshaft (not shown), or on crankshaft 22.

Crankshaft 22 drives at least one fuel pump to pull fuel from the fuel tank in order to move fuel toward fuel injectors 30. Control system 18 (FIGS. 1B-4) provides control signals to fuel injectors 30 that control operation thereof based on operating parameters for each fuel injector 30, such as the length of time fuel injectors 30 operate and the number of fueling pulses per a firing or injection cycle period, thereby determining the amount of fuel delivered by each fuel injector 30.

As shown in FIG. 1A, fuel system 20 includes a plurality of fuel injectors 30 positioned within cylinder head 16 and fluidly coupled to a fuel rail 31. Each fuel injector 30 is fluidly coupled to one combustion chamber 32. In operation, fuel system 20 provides fuel to fuel injectors 30, which is then injected into combustion chambers 32 by the action of fuel injectors 30, thereby forming one or more injection events or cycles. As detailed further herein, the injection cycle may be defined as the interval that begins with the movement of a nozzle or needle valve element 34 to permit fuel to flow from fuel injector 30 into an associated combustion chamber 32, and ends when nozzle valve element 34 moves to a position to block the flow of fuel from fuel injector 30 into combustion chamber 32. More particularly, nozzle valve element 34 of each fuel injector 30 may move from the closed position to the open position when fuel injector 30 is energized by control system 18 to inject fuel into combustion chamber 32 during an injection event. Nozzle valve element 34 remains open for a period, called the fuel on-time ("FON") and which corresponds to the injection event to provide a predetermined volume, amount, or quantity of fuel to combustion chamber 32, as determined by control system 18 based on engine operation state and inputs to engine 10, such as acceleration, torque or power, engine speed, and fuel pressure. At the end of the predetermined period, control system 18 de-energizes fuel injector 30, which causes nozzle valve element 34 to close, ending the injection event. While nozzle valve element 34 is described as opening when energized and closing when de-energized, fuel injector 30 may also operate in an opposite manner where nozzle valve element 34 opens when de-energized and closes when energized.

Figure 1B:
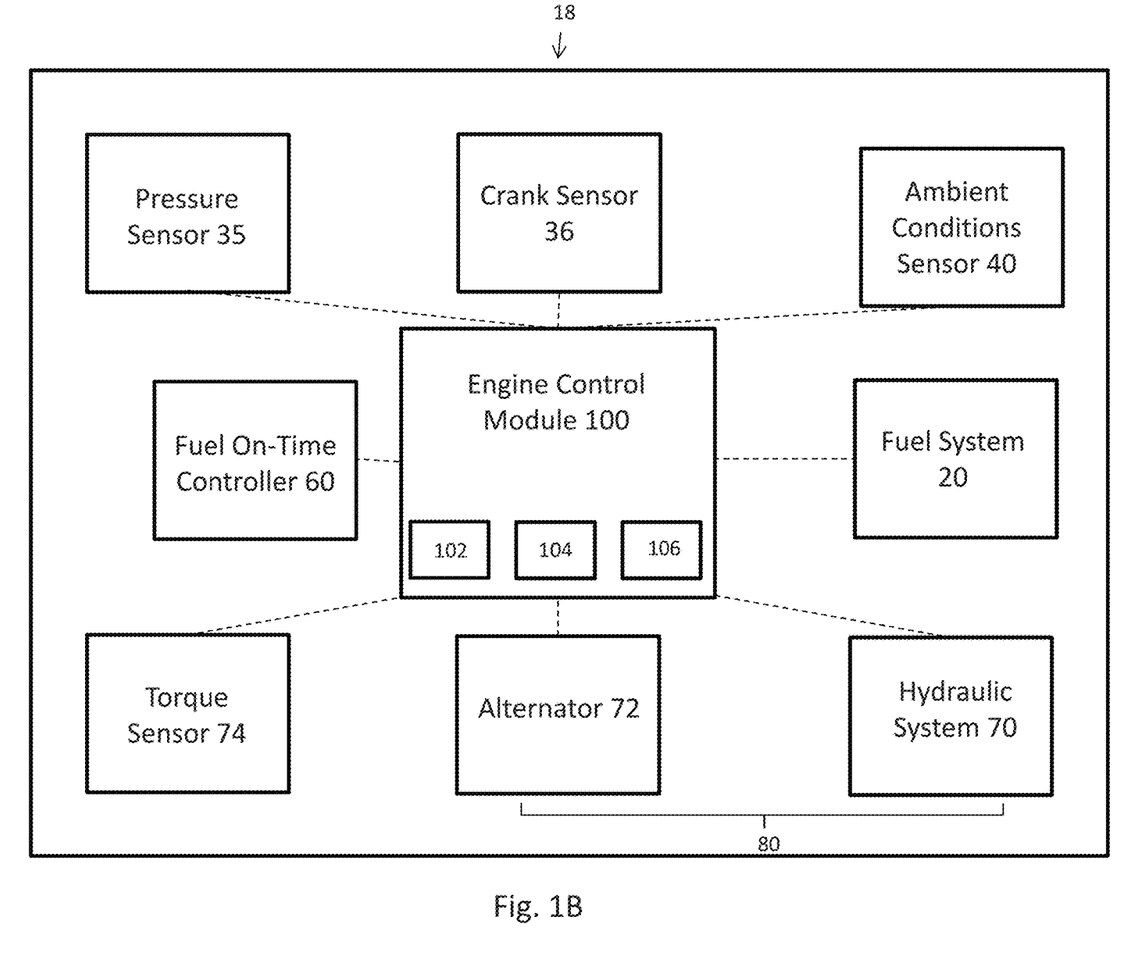
FIG. 1B is a schematic view of a control system for the engine and a fuel system.

Referring to FIG. 1B, control system 18 provides control signals to fuel injectors 30 that determine operating parameters for each fuel injector 30 which, together with the rail pressure, are used to calculate the amount of fuel delivered by each fuel injector 30. For example, the operating parameters may include the duration of the injection event or FON, the pressure within fuel rail 31, and/or the start-of-injection ("SOI") and may include other operating parameters for each fuel injector 30.

In addition to fuel system 20, control system 18 controls, regulates, and/or operates other components of engine 10 that may be controlled, regulated, and/or operated. More particularly, control system 18 may receive signals from sensors located on engine 10, such as a pressure sensor 35, crank sensor 36, an ambient conditions sensor 40, and a torque sensor 74, and transmit/receive control signals or other inputs to devices located on engine 10 in order to control or receive data from such devices, such as a hydraulic system 70 for engine 10, an electrical alternator 72 for engine 10, and a fuel on-time controller 60. Control system 18 may include a controller or engine control module ("ECM") 100 and a wire harness (not shown). ECM 100 may be a processor having a memory 102, a transmitter 104, and a receiver 106. For example, actions of control system 18 may be performed by elements of a computer system or other hardware capable of executing programmed instructions, for example, a general purpose computer, special purpose computer, a workstation, or other programmable data processing apparatus. These various control actions also may be performed by specialized circuits (e.g., discrete logic gates interconnected to perform a specialized function), by program instructions (software), such as logical blocks, program modules, or other similar applications which may be executed by one or more processors (e.g., one or more microprocessors, a central processing unit (CPU), and/or an application specific integrated circuit), or any combination thereof. For example, embodiments may be implemented in hardware, software, firmware, middleware, microcode, or any combination thereof. Instructions may be in the form of program code or code segments that perform necessary tasks and can be stored in a non-transitory, machine-readable medium such as a storage medium or other storage(s). A code segment may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. In this way, control system 18 is configured to control operation of engine 10, including fuel system 20.

One challenge with fuel injectors 30 is that they have a measure of variability from injector-to-injector, leading to a variation in fuel quantity or amount delivered by fuel injectors 30. In addition, the temperature of fuel injector 30, atmospheric conditions, and wear of components in fuel injector 30 or engine 10 may cause additional variation in fuel quantity delivered by an individual injector 30 during a fuel injection event, which corresponds to a fuel injector on-time. The variation in fuel quantity delivered causes undesirable variations in the power output of engine 10, causes undesirable variation in emissions, e.g., increases in nitrogen oxide ("NOx") and carbon monoxide ("CO"), and causes mechanical vibrations due to fueling imbalances. Additionally, a change in power of engine 10 may be determined by feedback from various components, such as a DC motor (not shown), alternator 72, generator (not shown), or a mechanical drive system having torque sensor 74 and/or wheel sensors (not shown). For example, the power output of engine 10 may increase or decrease based on variations in fuel quantity.

In order to minimize any undesirable effects leading to an undesirable change in power of engine 10, techniques of measuring fuel delivery by each fuel injector 30 have been developed according to the present disclosure. More particularly, control system 18 may be able to adjust a fueling parameter, such as FON or SOI, for each individual fuel injector 30 based on a cylinder pressure, a position of the centroid of combustion within each combustion chamber 32, emissions conditions, and/or a power feedback signal for engine 10.

Figure 2:
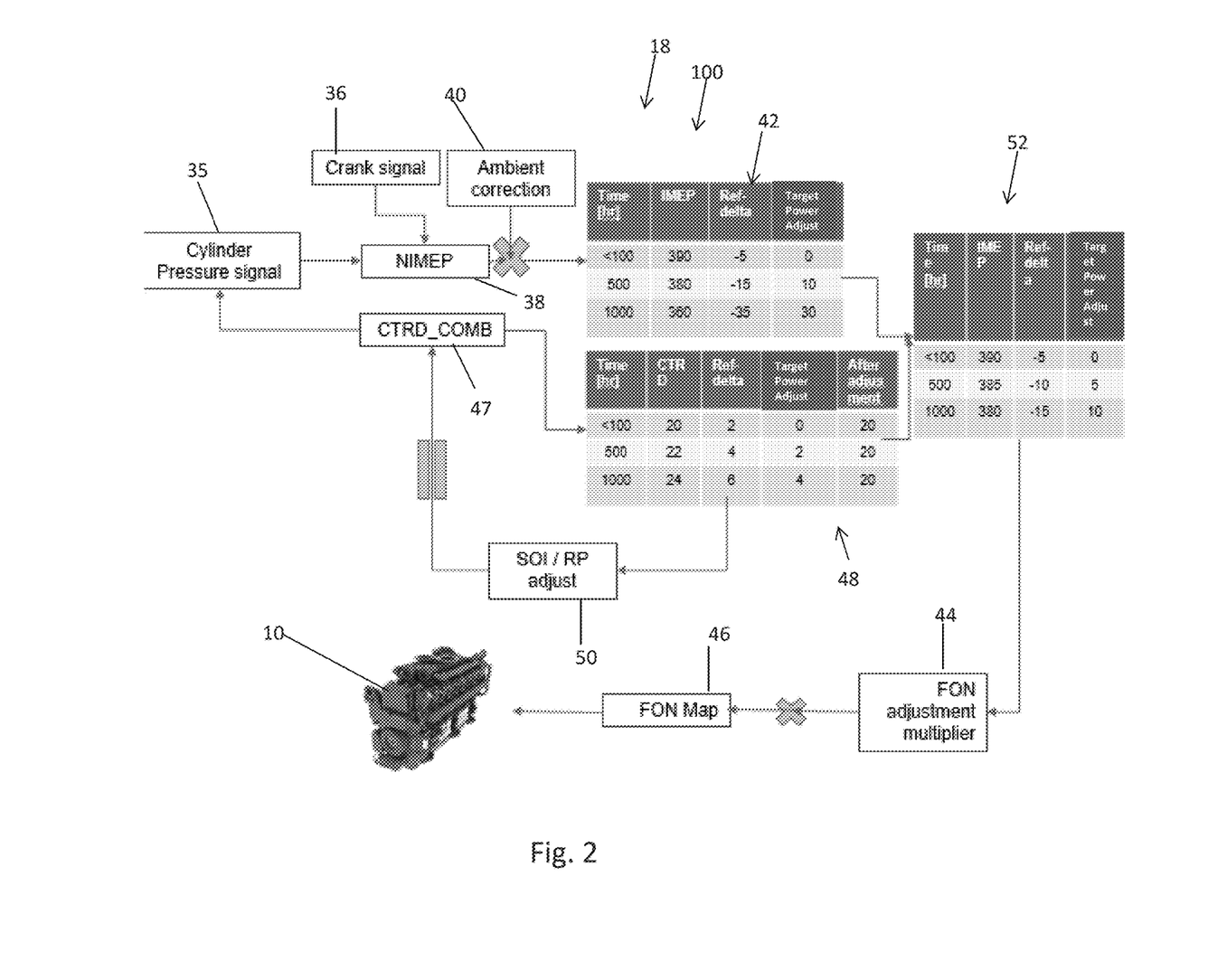
FIG. 2 is a flow diagram of an illustrative method of adjusting a fueling parameter to compensate for wear at a portion of the engine.

Referring to FIG. 2, control system 18 is configured to adjust a fueling parameter based on at least the cylinder pressure. More particularly, to compensate for variations in fuel quantity or the amount of fuel delivered by fuel injectors 30 which undesirably increase or decrease power from engine 10, control system 18 is configured to calculate the mean effective pressure of engine 10 to determine if a change in power is occurring. They variations in fuel quantity may be due to wear at nozzle valve element 34 (e.g., caused by cavitation) or wear within other components of fuel system 20 and/or engine 10. Illustratively, using an open-loop algorithm, receiver 106 of ECM 100 receives a signal from pressure sensor 35 within any or all of cylinder (s) 28. In one embodiment, pressure sensor 35 may be positioned within combustion chamber 32 or within a gasket at the interface between cylinder head 16 and cylinders 28. Receiver 106 of ECM 100 also is configured to receive a signal from crank sensor 36 which measures crank angle and/or crank speed. Using both the pressure signal 35 and crank signal 36, ECM 100 calculates the net indicated mean effective pressure ("NIMEP" or "IMEP") at 38 for any or all of cylinders 28.

Using the NIMEP calculation 38, receiver 106 also may receive an ambient conditions signal from ambient conditions sensor to provide information such as temperature, air pressure, and/or air humidity. Using the data from ambient conditions sensor 40, ECM 100 is then able to calculate a corrected NIMEP to account for ambient conditions which may affect fueling and/or emissions parameters. Control system 18 may continuously calculate the NIMEP for engine 10 throughout the operating life of engine 10. More particularly, as shown in FIG. 2, as engine 10 continues to operate for various time periods (e.g., 100 hours, 500 hours, 1000 hours), the NIMEP is determined for engine 10 and recorded in a Table 42 which may be stored within memory 102 of ECM 100. In this way, various parameters of engine 10 may be accumulated within ECM 100 and/or another component of control system 18, such as the number of injection events during the operating time of engine 10, the fuel injector pressure at various times during the operating time of engine 10, and other cumulative parameters.

Additionally, ECM 100 is configured to compare the NIMEP calculated at the various operating times in Table 42 to a stored reference chart for engine 10. The difference between the calculated NIMEP recorded in table 42 and the NIMEP recorded in the reference chart is then provided in Table 42 at "Ref-delta." The "Ref-delta" column indicates if the NIMEP is different from the standard or reference NIMEP for engine 10 and any difference between these values may indicate a power loss for engine 10 (e.g., due to wear at nozzle(s) 34 of fuel injectors 30, cylinder head 16, fuel pumps, or any other component of engine 10). If engine 10 is experiencing a change in power, ECM 100 may adjust the fuel on-time ("FON") for any or all of fuel injectors 30 to adjust the power output of engine 10, as indicated in the "Target Power Adjust" column of Table 42. More particularly, transmitter 104 of ECM 100 may transmit through a wired or wireless connection (e.g., CAN) a fuel on-time adjustment multiplier at 44 which is then applied to the current fuel on-times stored on a reference map or table within memory 102. By adjusting the fuel on-time, for example by decreasing or increasing the length of time nozzle 34 remains open, adjusting the times at which nozzle 34 opens and closes, adjusting pressure in fuel rail 31, or otherwise providing more fuel to cylinders 28, the completeness of combustion increases which allows engine 10 to produce more power, for example even if wear has occurred at fuel injectors 30, cylinder head 16, fuel pumps, or other components of engine 10 and/or fuel system 20. In one embodiment, using an equation such as $Y=X+Z$, where Y is the adjusted fuel on-time, X is the current fuel on-time duration, and Z is the adjustment value or multiplier, the adjusted fuel on-time may be the result of increasing the length of the fuel on-time by "Z" milliseconds. The adjusted fuel on-time map 46 may be stored in memory 102 or another component of control system 18 and used for all future fueling events until any further adjusted fuel on-time is calculated.

However, adjusting the fuel on-time may affect emissions from engine 10, for example by increasing the amount of NOx or particulate matter present in the emissions gas. Therefore, control system 18 also monitors emissions from engine 10 before, during, and/or after adjusting the fuel on-time in response to a signaled power loss. More particularly, using pressure sensor 35 and crank sensor 36, the position of the centroid of combustion within each combustion chamber 32 may be determined at 47. In other words, at 47, the position of the centroid of combustion is measured to determine where combustion is happening within combustion chamber 32, for example along a longitudinal axis of each combustion chamber 32 or at a position off-center from the longitudinal axis of each combustion chamber 32. If it is determined that the centroid of combustion has shifted from a predetermined position, for example, if the centroid of combustion is meant to occur along the longitudinal axis of combustion chamber 32 but has shifted to a position laterally offset from the longitudinal axis, this may cause an undesirable change or increase in emissions. As such, the fuel on-time also may be adjusted to correct the shifted centroid of combustion within combustion chamber 32. Additionally, ECM 100 may receive emissions feedback from an aftertreatment assembly (not shown) indicating an increase in various emissions parameters (e.g., NOx, particulate matter, etc.), thereby also indicating that the centroid of combustion may have shifted or that an adjustment may be needed to the fuel on-time or other fueling parameters.

In operation, using at least pressure sensor 35 and crank sensor 36, the position of the centroid of combustion is calculated to determine the position of the centroid of combustion within combustion chamber 32 and may transmit that information to receiver 106 of ECM 100. ECM 100 may continuously monitor and determine the position of the centroid of combustion for each combustion chamber 32 of engine 10 throughout the operating life of engine 10. More particularly, as shown in FIG. 2, as engine 10 continues to operate for various time periods (e.g., 100 hours, 500 hours, 1000 hours), the position of the centroid of combustion ("CTRD") is stored in a Table 48 such that cumulative positions of the CTRD is stored therein. Additionally, ECM 100 is configured to compare the recorded position(s) of the centroid of combustion at the various operating times in Table 48 to a reference chart for engine 10 which includes reference positions for the centroid of combustion which may be stored in memory 102. The difference between the measured position of the centroid of combustion recorded in Table 48 and the reference position of the centroid of combustion recorded in the reference chart is then provided in Table 48 at "Ref-delta." The "Ref-delta" column indicates if the measured position of the centroid of combustion is different from the reference or standard position for the centroid of combustion for each combustion chamber 32, thereby indicating if emissions may be affected (e.g., increase in NOx). If emissions are affected by a shift in the position of the centroid of combustion, ECM 100 may adjust the FON for any or all of fuel injectors 30 to adjust the emissions from engine 10, as indicated in the "Target Power Adjust" column of Table 48. More particularly, ECM 100 may transmit through a wired or wireless connection (e.g., CAN or a private message system) a signal to adjust the SOI and/or the rail pressure at 50 which is then applied to the current fueling parameters stored on a reference map or table within memory 102. By adjusting the SOI and/or the rail pressure for any or all fuel injectors 30, for example by opening nozzle 34 at an earlier time, the centroid of combustion may shift back to the desired position (e.g., along the longitudinal axis of cylinder 28). As shown in Table 48, the combustion sensor continues to monitor the centroid of combustion and stores the position of the centroid of combustion in the "After Adjustment" column to continuously indicate if the adjustment to the SOI and/or rail pressure is effective.

Using both Tables 42 and 48, ECM 100 is configured to combine the necessary adjustment to the fuel on-time based on Table 42 and to the SOI and/or rail pressure based on Table 48 in a Table 52, as shown in FIG. 2. As such, for example if fuel injectors 30 and/or other components of engine 10 or fuel system 20 experience wear which affects fueling and/or combustion parameters, ECM 100 is able to make simultaneous adjustments to the fuel on-time, the SOI, and/or the rail pressure by calculating fuel on-time adjustment modifier 44 based on Table 52 and using adjusted fuel on-time map 46 to adjust the fueling parameters for various fuel injectors 30, as shown in FIG. 2.

Figure 3:
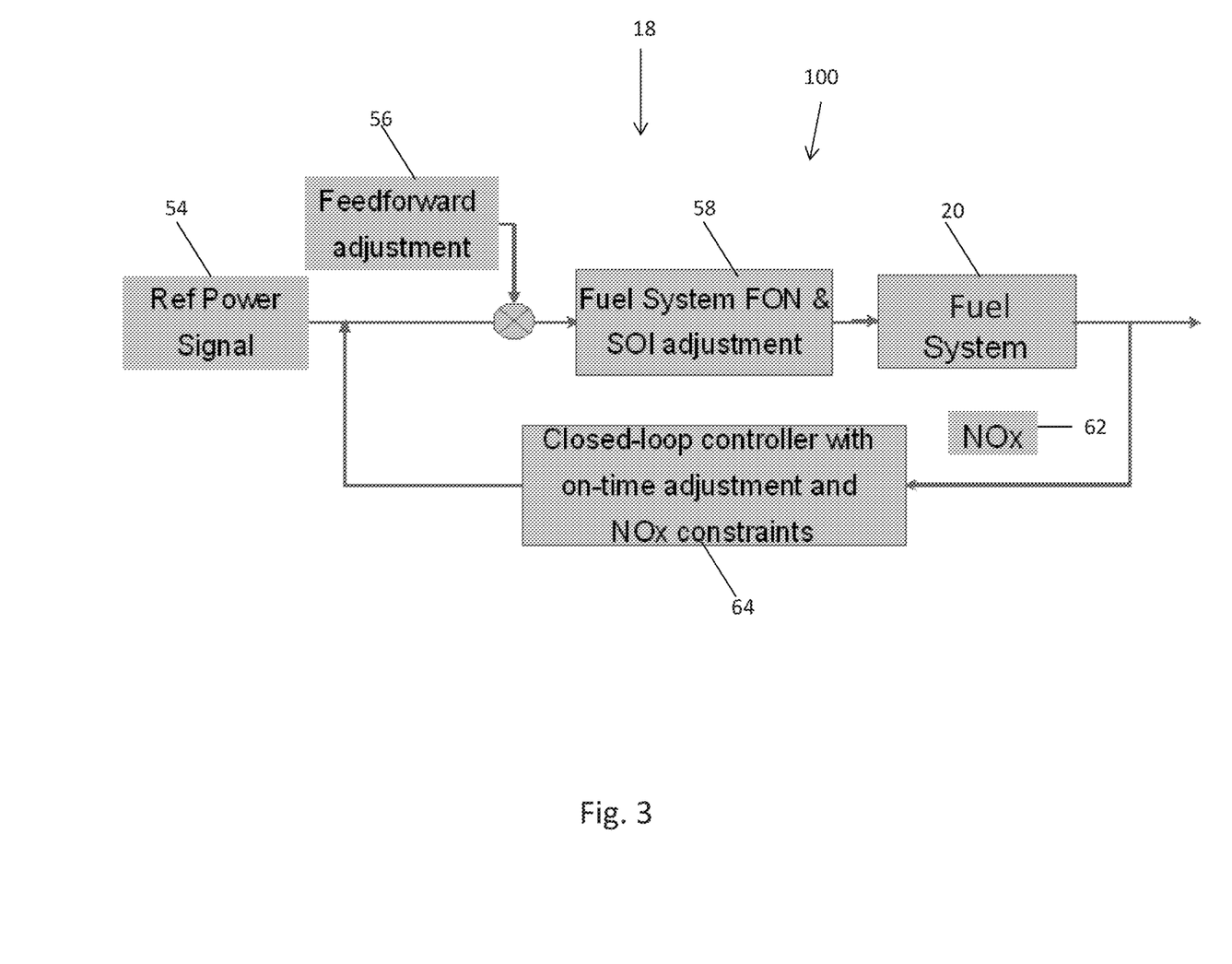
FIG. 3 is a flow diagram of another illustrative method of adjusting a fueling parameter to compensate for wear at a portion of the engine.

Referring to FIG. 3, in another embodiment, receiver 106 of ECM 100 also is configured to receive feedback from power system 80 for engine 10 to determine if engine 10 is experiencing a change in power. More particularly, using a closed-loop or an open-loop algorithm, control system 18 receives a power feedback signal from various components, such as torque sensor 74, wheel speed sensors (not shown), and/or alternator 72, instead of monitoring pressure in combustion chambers 32, as disclosed above with respect to FIG. 2. In this way, no additional pressure sensor at each cylinder 28 is included for measuring any power loss in engine 10. Additionally, control system 18 also continues to monitor emissions from engine 10 to ensure that adjustments made to the fueling parameters based on the feedback from power system 80 also maintain proper emissions conditions.

As shown in FIG. 3, receiver 106 of ECM 100 first receives a reference power signal 54 from any component of power system 80. For example, ECM 100 may receive voltage and current signals from electrical alternator 72, data from a flow sensor in hydraulic system 70, or a signal from torque sensor 74 all of which correspond to the power output of engine 10 and may be used to determine if engine 10 is experiencing a change in power (e.g., an unexpected or undesirable increase or decrease in power due to wear at fuel injector(s) 30). ECM 100 compares reference power signal 54 to reference maps or tables stored in memory 102 of ECM 100 to determine if any adjustment should be made to the FON, the rail pressure, and/or SOI for any fuel injector 30 to compensate for any change in power, as shown at 56. If a fuel on-time, rail pressure, and/or SOI adjustment is to be made because reference power signal 54 indicates that engine 10 is experiencing a power loss, ECM 100 calculates fuel on-time adjustment multiplier 44 (FIG. 2) and/or a change to SOI and/or the rail pressure, as shown at 58, and transmitter 104 transmits the adjusted fueling parameters to fuel injectors 30 through any wired or wireless connection (e.g., CAN or a private message system). In one embodiment, each individual injector 30 may be directly connected to and driven by a respective injector driver stage (not shown) on ECM 100. ECM 100 switches the driver (not shown) on and off at the desired moments in time. The duration between switching fuel injector 30 on and off is effectively "FON". As such, the FON value itself may not be transmitted from ECM 100 to fuel injector 30, but rather, ECM 100 may directly switch fuel injector 30 on/off through the driver.

However, adjusting the fuel on-time can affect emissions from engine 10, for example by increasing the amount of NOx present in the emissions gas. Therefore, as shown at 62, ECM 100 also monitors emissions from engine 10 before, during, and/or after adjusting the fuel on-time in response to a signaled power loss. More particularly, control system 18 may receive emissions feedback from the after-treatment assembly (not shown) indicating an increase in various emissions parameters (e.g., NOx, particulate matter, etc.). As such, if the adjustment to the fuel on-time, the rail pressure, and/or SOI due to the change in power has negatively impacted emissions, then ECM 100 can process the emissions feedback with a closed-loop or open-loop controller 64 to further adjust the fueling parameters (e.g., fuel on-time) to ensure that engine 10 is meeting both the power and emissions parameters.

Figure 4:
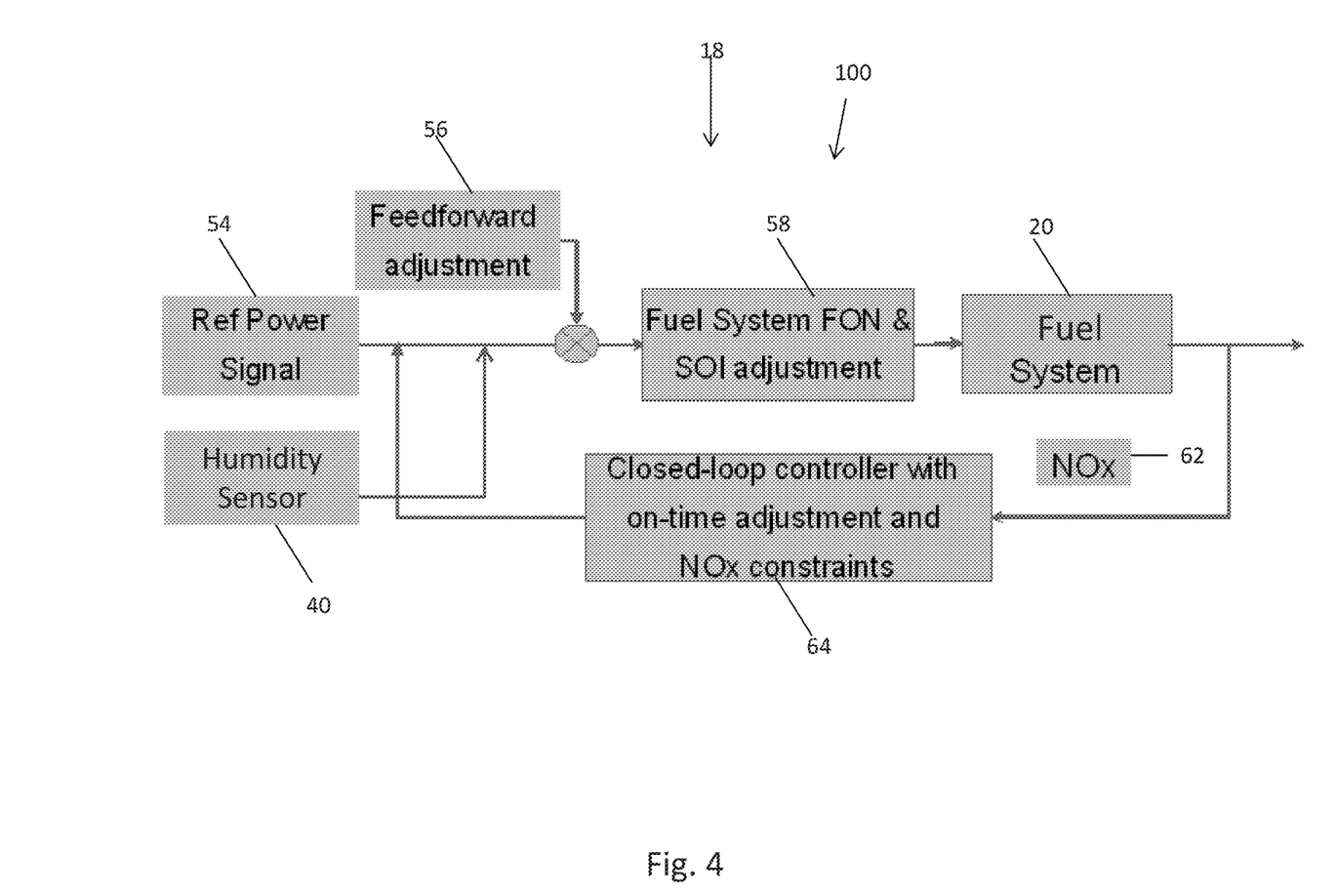
FIG. 4 is a further flow diagram of another illustrative method of adjusting a fueling parameter to compensate for wear at a portion of the engine.

Referring to FIG. 4, in another embodiment, ECM 100 is configured to receive feedback from power system 80 for engine 10 to determine if engine 10 is experiencing a power loss. Additionally, ECM 100 also continues to monitor emissions from engine 10 to ensure that adjustments made to the fueling parameters based on the feedback from power system 80 also maintain proper emissions conditions. Further, as shown in FIG. 4, ECM 100 also is configured to monitor ambient conditions which allow ECM 100 to determine if any changes in emissions are due to fueling or due to environmental factors, such as humidity, air pressure, temperature, etc.

As shown in FIG. 4, control system 18 operates in the same manner as shown in FIG. 3 but includes ambient conditions sensor 40 which is configured to measure and transmit data regarding the humidity or the oxygen concentration at cylinder 28 to receiver 106 of ECM 100. In this way, ECM 100 is able to determine if changes in emissions are due to the fueling parameters or if the humidity or oxygen concentration at cylinder 28 is affecting the emissions output. For example, if it is determined that the amount of NOx 62 or particulate matter has increased, then using ambient conditions sensor 40, ECM 100 is able to determine if the change in emissions conditions is merely due to the humidity, in which case no additional adjustment to the fuel on-time, the rail pressure, or the SOI is needed, or if the change in emissions conditions is due to the adjustment to the fueling parameters, in which an additional adjustment to the fuel on-time, the rail pressure, or SOI may be needed.

Using any of the embodiments of FIGS. 2, 3, and 4 above, the fuel on-time of each fuel injector 30 can be adjusted individually to accommodate varying levels of wear at each fuel injector 30 which may increase or decrease the power output of engine 10. More particularly, not all fuel injectors 30 wear evenly nor may the centroid of combustion shift in the same way in each combustion chamber 32. As such, the embodiments of FIGS. 2, 3, 4 are configured to individually monitor and adjust fueling and emissions criteria for each individual combustion chamber 32 and fuel injector 30 to compensate for any power loss, increase in power, or increase in emissions for engine 10. In this way, an adjustment to the fuel on-time, the rail pressure, or SOI for one fuel injector 30 is not categorically applied to all fuel injectors 30, but instead, each fuel injector 30 is individually monitored and adjusted as needed, depending on the conditions, wear, and combustion occurring at that fuel injector 30 and/or in a corresponding combustion chamber 32.

In general, operation at high rail pressure may be more damaging to various components of engine 10 and/or fuel system 20 than operation at low rail pressure. By tracking a cumulative number of various parameters, such as the cumulative number of injection events, which have occurred at various rail pressure levels, ECM 100 of FIGS. 2, 3, and 4 is configured to estimate the cumulative wear (e.g., percent of injector life consumed) using an algorithm, model, or other type of instructions program and also is configured to adjust fueling parameters (e.g., fuel on-time and/or start-of-injection time) for each respective fuel injector 30 in an open-loop manner to compensate, as shown as feedforward adjustment 56 in FIG. 4, for example.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A method of controlling a fuel injector, comprising:
   measuring a pressure in a cylinder of an engine with a pressure sensor;
   determining a crank angle and a crank speed with a crank sensor;
   calculating, with an engine control module, a net indicated mean effective pressure of the cylinder from the measured value of the pressure in the cylinder and the determined values of the crank angle and the crank speed;
   determining, with the engine control module, a difference between the calculated net indicated mean effective pressure and a reference mean effective pressure; and
   adjusting, with the engine control module, a fueling parameter of the fuel injector for the cylinder in response to the difference between the calculated net indicated mean effective pressure and the reference mean effective pressure indicating a change in power of the engine.

2. The method of claim 1, further comprising measuring an ambient condition and adjusting the fueling parameter in response to the ambient condition.

3. The method of claim 1, further comprising measuring an emissions condition of the engine and comparing the measured emissions condition to a reference emissions condition.

4. The method of claim 3, further comprising adjusting the fueling parameter of the fuel injector in response to a difference between the measured emissions condition and the reference emissions condition.

5. The method of claim 1, further comprising measuring a position of a centroid of combustion for the cylinder.

6. The method of claim 5, further comprising comparing the measured position of the centroid of combustion with a reference position of the centroid of combustion for the cylinder.

7. The method of claim 6, further comprising, adjusting the fueling parameter of the fuel injector in response a difference between the measured position of the centroid of combustion and the reference position of the centroid of combustion for the cylinder.

8. The method of claim 1, wherein the fueling parameter is at least one of a fuel on-time period, a fuel rail pressure, or a start-of-injection time.

9. The method of claim 1, wherein adjusting the fueling parameter includes applying a fuel on-time adjustment value to an existing fuel on-time period for the fuel injector.

10. A method of controlling a fuel injector, comprising:
    obtaining a power signal indicative of a power output of an engine;
    transmitting to an engine control module the power signal;
    determining, with the engine control module, a difference between the obtained power signal and a reference power signal; and
    adjusting, with the engine control module, a fueling parameter of the fuel injector in response to the difference between the obtained power signal and the reference power signal indicating a change in power of the engine,
    wherein the power signal is at least one of a voltage signal from an electrical alternator of the engine, a current signal from the electrical alternator, or a flow signal from a hydraulic system of the engine.

11. The method of claim 10, further comprising measuring an emissions condition of the engine and comparing the measured emissions condition to a reference emissions condition.

12. The method of claim 11, further comprising adjusting the fueling parameter of the fuel injector in response to a difference between the measured emissions condition and the reference emissions condition.

13. The method of claim 10, further comprising measuring an air humidity and adjusting the fueling parameter in response to the air humidity.

14. The method of claim 13, further comprising comparing the air humidity to an emissions condition to determine if a change in the emissions condition is in response to the air humidity or the fueling parameter.

15. A control system for an engine, comprising:
    a control module including a memory, at least one receiver, and at least one transmitter;

a pressure sensor operably coupled to the control module and configured to transmit a cylinder pressure to the receiver;

a crank sensor operably coupled to the control module and configured to transmit at least one of a crank angle or a crank speed to the receiver;

an ambient conditions sensor operably coupled to the control module and configured to transmit at least two of a temperature, humidity, or air pressure to the receiver; and an emissions sensor operably coupled to the control module and configured to transmit at least one emissions condition to the receiver;

wherein the control module is configured to calculate a net indicated mean effective pressure in response to the cylinder pressure and the at least one of the crank angle or the crank speed and the at least two of the temperature, humidity, or air pressure, and the transmitter of the control module is configured to transmit a fuel adjustment signal to a fuel injector of the engine in response to the calculated net indicated mean effective pressure.

16. The control system of claim 15, wherein the emissions condition is at least one of an amount of particulate matter or an amount of nitrogen oxide present in an emissions fluid.

17. The control system of claim 15, wherein the control module is configured to detect a position of a centroid of combustion for a cylinder and the transmitter sends the fuel adjustment signal to the fuel injector based on the position of the centroid of combustion.

18. The control system of claim 15, wherein the control module is operably coupled to a plurality of fuel injectors and a plurality of cylinders of the engine, wherein each of the fuel injectors is associated with one of the cylinders.

19. The control system of claim 18, wherein the control module is configured to individually adjust a fueling parameter for each fuel injector independent of the other fuel injectors.

20. The control system of claim 19, wherein the control module is configured to estimate cumulative wear of at least one of the fuel injectors and send the fuel adjustment signal to the at least one of the fuel injectors based on the estimated cumulative wear.

* * * * *